United States Patent
Marian, Jr.

[11] Patent Number: 5,846,097
[45] Date of Patent: Dec. 8, 1998

[54] SUBMERSIBLE CONNECTOR SYSTEM

[75] Inventor: Vaughn R. Marian, Jr., Saratoga, Calif.

[73] Assignee: Acuson Corporation, Mountain View, Calif.

[21] Appl. No.: 538,870

[22] Filed: Oct. 4, 1995

[51] Int. Cl.$^6$ .................. H01R 13/22; H01R 13/635
[52] U.S. Cl. .................. 439/289; 439/76.1; 439/372; 439/955
[58] Field of Search .................. 439/76.1, 66, 289, 439/310, 929, 372, 955

[56] References Cited

U.S. PATENT DOCUMENTS

| | | | |
|---|---|---|---|
| 3,905,672 | 9/1975 | Anhalt et al. | 439/599 |
| 4,550,607 | 11/1985 | Maslak et al. | 73/626 |
| 4,699,009 | 10/1987 | Maslak et al. | 73/626 |
| 5,190,473 | 3/1993 | Mroczkowski et al. | 439/580 |
| 5,308,252 | 5/1994 | Mroczkowski et al. | 439/66 |
| 5,310,352 | 5/1994 | Mroczkowski et al. | 439/76 |
| 5,358,411 | 10/1994 | Mroczkowski et al. | 439/66 |
| 5,410,208 | 4/1995 | Walters et al. | 310/334 |
| 5,415,175 | 5/1995 | Hanafy et al. | 128/662.03 |
| 5,417,578 | 5/1995 | Mroczkowski et al. | 439/101 |
| 5,425,654 | 6/1995 | Colleran et al. | 439/372 |
| 5,515,728 | 5/1996 | Casarcia et al. | 73/623 |

OTHER PUBLICATIONS

R. Rothenberger, R.S. Mroczkowski, High Density Zero Insertion Force Microcoaxial Cable Interconnection Technology, AMP Inc.

*Primary Examiner*—Neil Abrams
*Attorney, Agent, or Firm*—Ladas & Parry

[57] ABSTRACT

A connector system for use with ultrasound imaging probes is fully submersible in liquids and saturated steam at elevated temperatures and pressure, and is durable over many connect/disconnect cycles. The system includes a submersible connector (32) for terminating a probe assembly (26) and a receptacle assembly (74) for mating the submersible connector (32) with an ultrasound imaging system (10). The submersible connector (32) includes a printed wiring board (34) having plated contact pads (48) on one surface and microcoaxial cable terminations (54) on the opposite side. A molded housing (36) encloses the microcoaxial cable terminations (54) and is bonded to the printed wiring board (34). The edges of the printed wiring board (34) are used to align the submersible connector (32) within the receptacle assembly (74). The molded housing (36) is narrowed in one dimension to make available a portion of the printed wiring board (34) for clamping in a locked position. Blind vias (68, 72) are used to connect the contact pads (48) and cable termination pads (54) through the printed wiring board (34), to prevent corrosive fluids and steam from entering the region protected by the molded housing (36). A preferred embodiment of a receptacle assembly (74) for electrically and mechanically mating with the submersible connector (32) includes a manually operated self guiding mechanism for receiving the submersible connector (32), aligning it with mating contacts (98) and locking the connector (32) into a mated position. The receptacle assembly (74) is easily operated for quick connect and disconnect of a cable terminated with a submersible connector (32) by use of a handle (88) for rotating a cam (106) that actuates a movable slide (86).

29 Claims, 8 Drawing Sheets

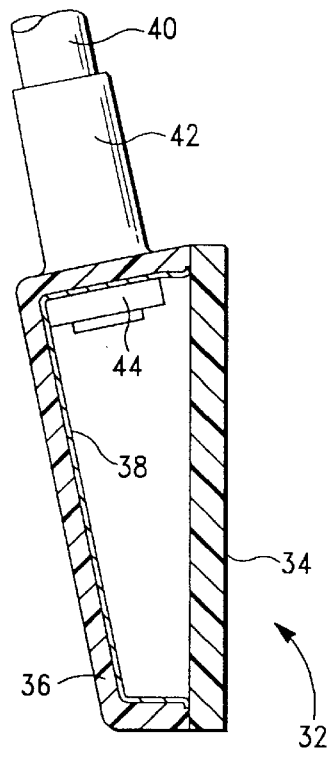
FIG.—3A
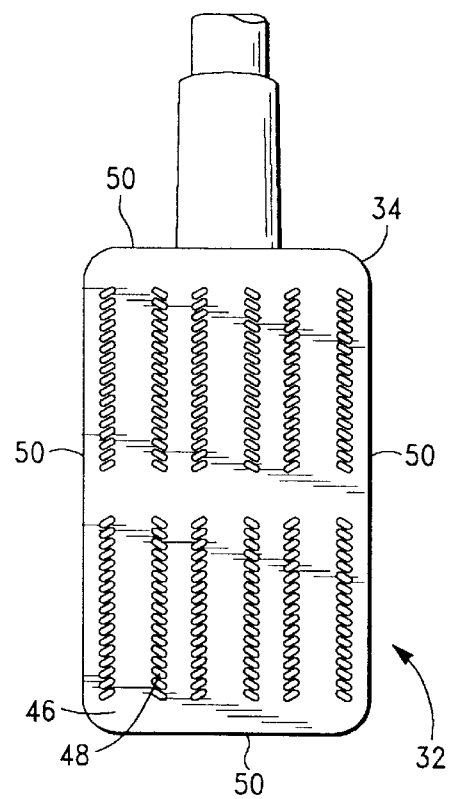
FIG.—3B
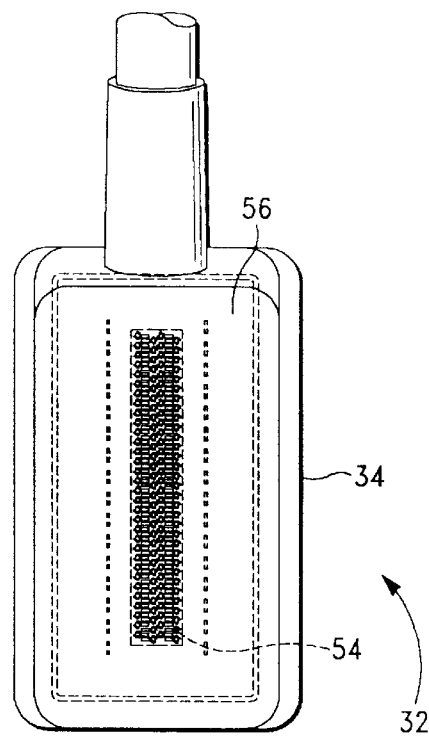
FIG.—3D
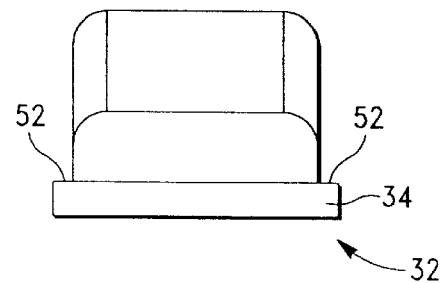
FIG.—3C

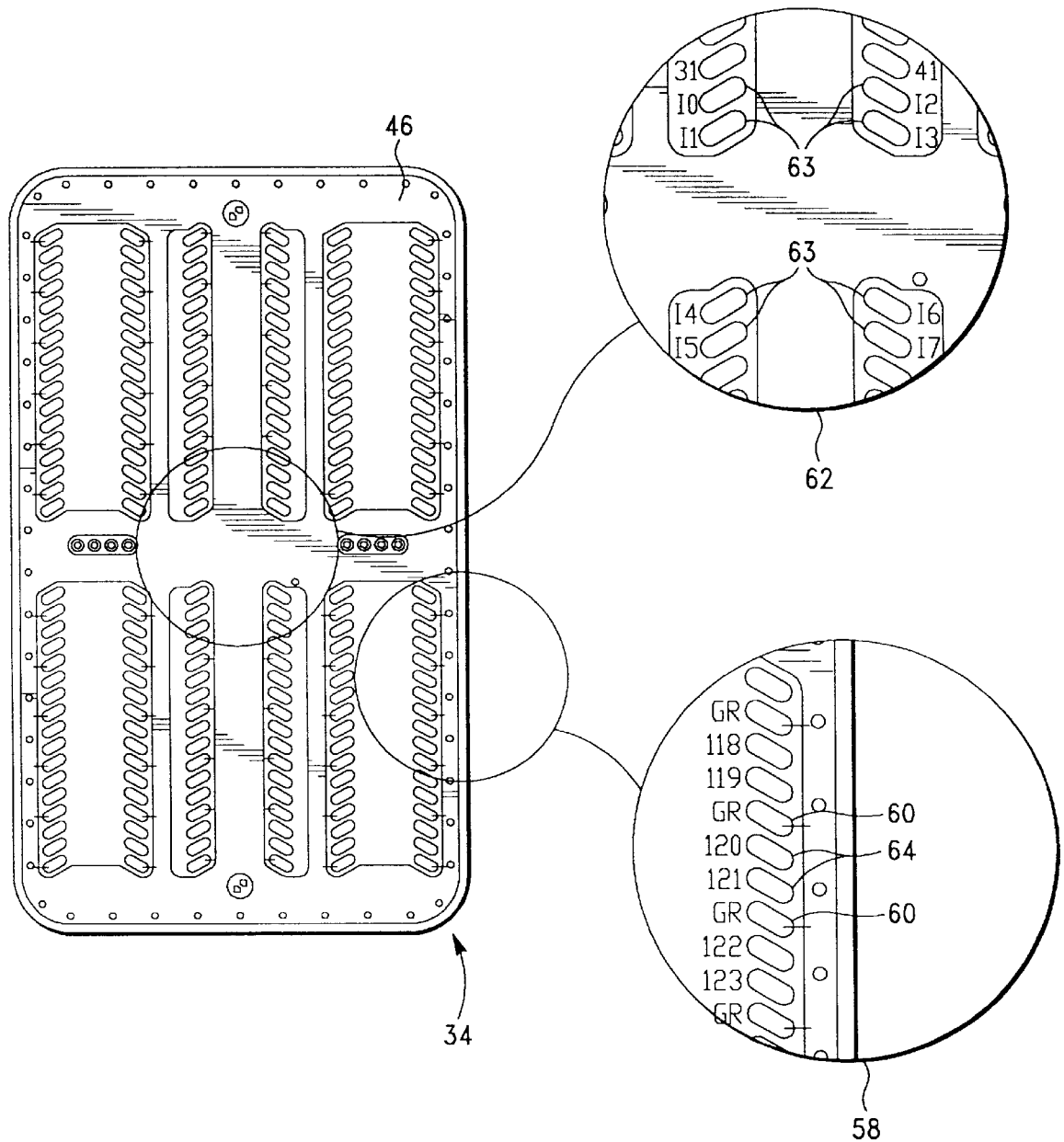
FIG.—4A

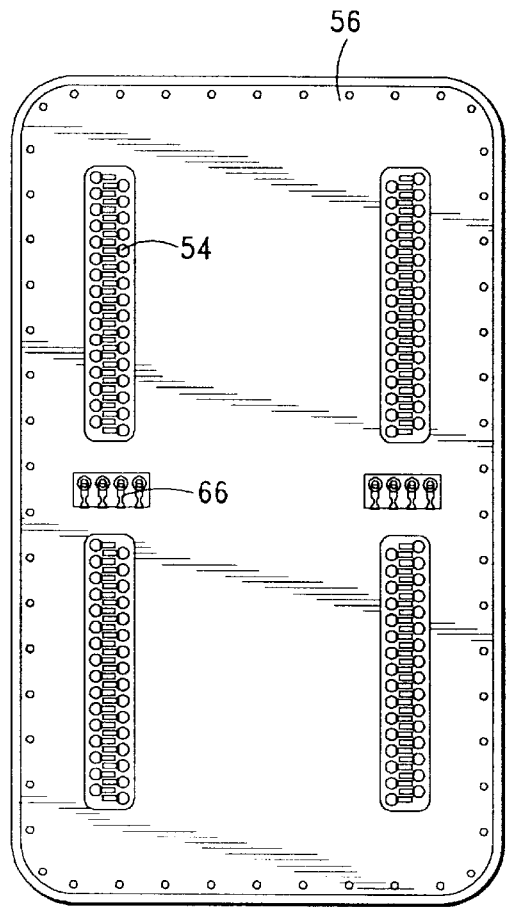
FIG.—4B
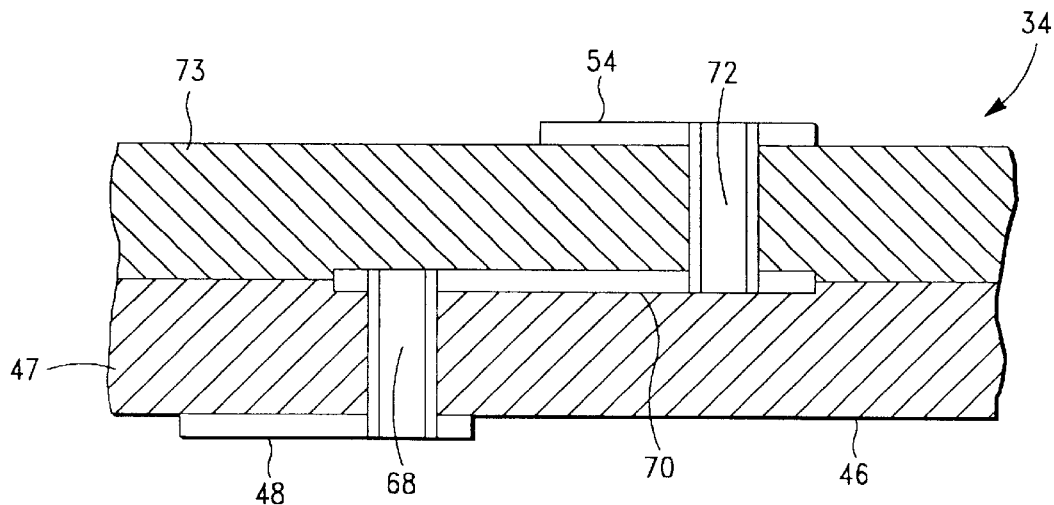
FIG.—5

SUBMERSIBLE CONNECTOR SYSTEM

BACKGROUND OF THE INVENTION

1. Field of the Invention

This invention relates generally to the field of electrical connectors and more particularly to an electrical connector system for attaching an ultrasound transducer assembly to an ultrasound system console.

2. Previous Art

An ultrasound imaging system generally includes an ultrasound transducer assembly and a system console. A typical ultrasound imaging system is shown in FIG. 1 and includes electrical connectors for attaching the transducer assembly to the system console. Known ultrasound imaging systems of the type illustrated in FIG. 1 are disclosed in U.S. Pat. Nos. 4,550,607 and 4,669,009, both to Maslak et al. and assigned to the assignee of the present invention. The teachings of these patents are incorporated herein by reference.

The ultrasound transducer assembly generally includes a scan head, an interfacing cable and a connector. The system console includes a mating connector (referred to hereafter as a "system receptacle") for attachment of the transducer assembly, and also includes a display monitor for displaying system generated images.

When properly controlled by the system console, the scan head radiates ultrasound acoustic waves into the body of a patient. The same scan head receives acoustic echoes from internal body organs, and converts these echoes into electrical signals which are then conveyed to the system console through the interfacing cable and the connectors. The electrical signals are then interpreted by the system console and an image of the internal body organ is created and displayed on the monitor.

In an imaging system employing phased array ultrasound, the scan head consists of a multitude of independent piezoelectric elements arranged in a linear array. Such an array and imaging system are disclosed in U.S. Pat. Nos. 4,550,607 and 4,669,009. Typically, each element of the linear array is independently controlled by a separate coaxial signal line within the transducer assembly interfacing cable. Since many coaxial cables are typically involved, the connector interface between the ultrasound transducer assembly and the system console can become quite complex. The important requirements of this interface include:

1. Convenience: The ultrasound practitioner may change the ultrasound transducer assembly several times during the course of a patient examination. Transducers of different frequencies and sizes are required for diverse diagnostic procedures; the optimum transducer for a given patient examination is important in arriving at a correct diagnosis. It is therefore desirable that the operation of the interface connection between the transducer assembly and the console be simple, intuitive, and rugged.

2. Electrical integrity: The quality of the images generated on the display monitor of the system console are very dependent upon the electrical characteristics of the connector interface. Cross talk between the multitude of channels and electrical interference to and from external electrical equipment must be minimized. The frequency of the analog signals passed to and from the transducer assembly can range between 1 MHz and 50 MHz. The signal voltage levels can range from nano-volts to hundreds of volts. Therefore it is desirable that the connector interface be electrically compatible with signals having a broad dynamic range.

3. Longevity: The transducer assembly is attached to the system console thousands of times over the functional life of the assembly. Degradation of the electrical or mechanical interface can affect the quality of the diagnostic results. It is therefore desirable to provide a system having an interface connection which remains sound throughout a long period of use.

Recent concerns over the transmission of communicable diseases have made it desirable to design equipment that is sterilizable. Since the transducer scan head is placed directly on the body during normal examination, or placed within the body during endo-cavity or surgical procedures, it is desirable that the transducer assembly be sterilizable by submersion in liquid solutions containing common disinfectants, or in saturated steam at elevated temperatures. Transducer scan heads that are not submersible can be used in endo-cavity or intra-operative procedures only if encapsulated in a sterile plastic sheath, or the like. This is not only inconvenient, but it degrades the ultrasound image quality because of the more complicated acoustic pathway between the scan head and the body.

SUMMARY OF THE INVENTION

It is an object of this invention to provide a submersible connector for use with an ultrasound transducer assembly.

Definition

For purposes of this invention, a "submersible" connector maintains electrical and mechanical integrity when placed in liquid or gaseous phases, or both. For example, the connector can be placed in liquid precleaning and disinfecting solutions of any type, aqueous or otherwise, and can be autoclaved with saturated steam at temperatures up to 140 degrees centigrade and pressures up to 2 atmospheres absolute.

It is another object of this invention to provide a compatible mating connector (system receptacle) for the submersible connector, the two connectors forming a connector system.

It is an object of this invention to provide such a connector system for connecting an ultrasound transducer assembly, requiring a large number of microcoaxial cables, to an ultrasound system console.

It is also an object of this invention to provide such a connector system which will provide electrical signal integrity over wide voltage and frequency ranges.

It is also an object of this invention to provide such a connector system which is rugged, easy to use and capable of thousands of connect/disconnect cycles over its useful lifetime.

In accordance with the above objects and those that will be mentioned and will become apparent below, the submersible connector for electrically connecting a transducer assembly to an ultrasound system console in accordance with this invention comprises:

a printed wiring board having contact pads on one surface and cable termination pads on an opposed surface, blind vias electrically connecting predetermined contact pads to predetermined cable termination pads through the printed wiring board; and a housing enclosing the cable termination pads, the housing including an opening for a cable, the opening being adapted for sealing with the cable, whereby the connector is submersible in a liquid without an intrusion of the liquid onto the cable termination pads, and whereby the connector is submersible in steam at elevated temperature and pressure without intrusive degradation.

In a preferred embodiment of the submersible connector, the contact pads and contact pad edges are gold plated to minimize damage by corrosive fluids.

In another preferred embodiment of the submersible connector, the housing is smoothly molded around the cable and bonded to the printed wiring board. This streamlined configuration provides limited opportunities for foreign matter to collect, thereby improving cleaning by immersion in common disinfectants.

One preferred embodiment of the submersible connector includes a printed wiring board having signal and ground return contact pads arranged in a high signal-to-ground ratio for improved contact density and minimized electrical cross talk.

A preferred embodiment of a receptacle assembly for electrically and mechanically mating with the submersible connector includes a manually operated self guiding mechanism for receiving the submersible connector, aligning it with mating contacts and locking the connector into a mated position. The receptacle assembly is easily operated for quick connect and disconnect of a cable terminated with a submersible connector according to one aspect of the present invention.

Other embodiments of the receptacle assembly include its use for connecting the submersible connector to electrical equipment having a non-compatible connector, and for providing an extension cable for connecting a submersible connector at a distance from the electrical equipment.

This invention advantageously provides a connector system for a submersible connector which is rugged, easy to use and permits the submersible connector to be immersed in the common disinfectants, and to be autoclaved in saturated steam at elevated temperatures and pressures.

BRIEF DESCRIPTION OF THE DRAWING

For a further understanding of the objects and advantages of the present invention, reference should be had to the following detailed description, taken in conjunction with the accompanying drawing, in which like parts are given like reference numerals and wherein:

FIG. 3A is a side cross-sectional view of a submersible connector in accordance with one aspect of the present invention.

FIG. 3B is a bottom view of the submersible connector illustrated in FIG. 3A.

FIG. 3C is an end view of the submersible connector illustrated in FIGS. 3A and 3B.

FIG. 3D is a top cross-sectional view of the submersible connector illustrated in FIGS. 3A–3C.

FIGS. 4A and 4B are a bottom and a top view, respectively, of a printed wiring board for use in the submersible connector shown in FIGS. 3A–3D.

FIG. 5 is a partial cross-sectional view of a portion of the printed wiring board shown in FIGS. 4A and 4B illustrating blind vias connecting pads on opposed surfaces of the printed wiring board.

FIG. 6A illustrates the assembly in an open orientation for receiving the submersible connector. FIG. 6B illustrates the assembly in a closed orientation mating the submersible connector to a system.

DETAILED DESCRIPTION OF THE PREFERRED EMBODIMENTS

Figure 1:
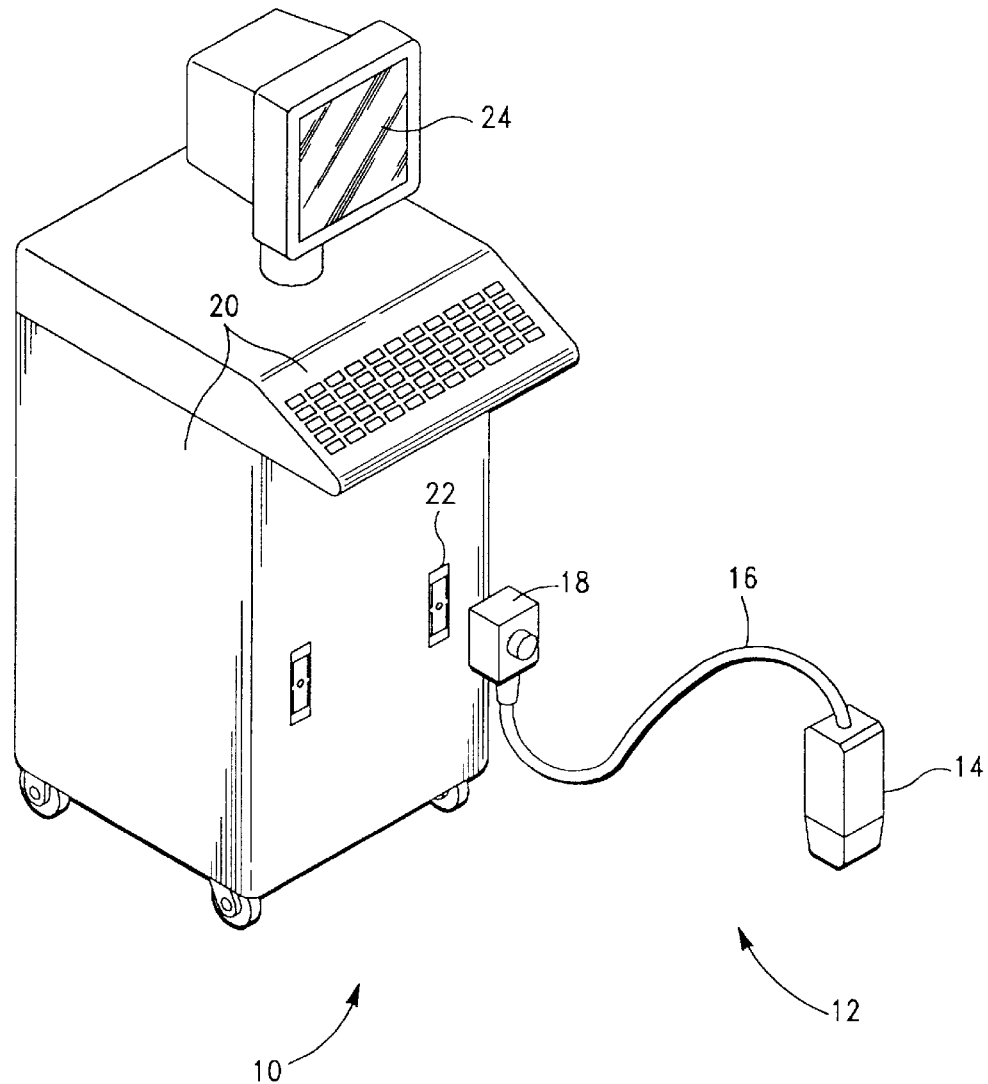
FIG. 1 is a pictorial diagram of a complete ultrasound imaging system.

The invention will now be described with respect to FIG. 1, a pictorial diagram illustrating a known ultrasound imaging system, depicted generally by the numeral 10. The ultrasound imaging system 10 includes an ultrasound transducer assembly 12 having a scan head 14, a cable 16 and a connector 18. The ultrasound imaging system 10 also includes a system console 20 having a system connector 22 for the connection of the transducer assembly 12, and a display monitor 24.

Figure 2:
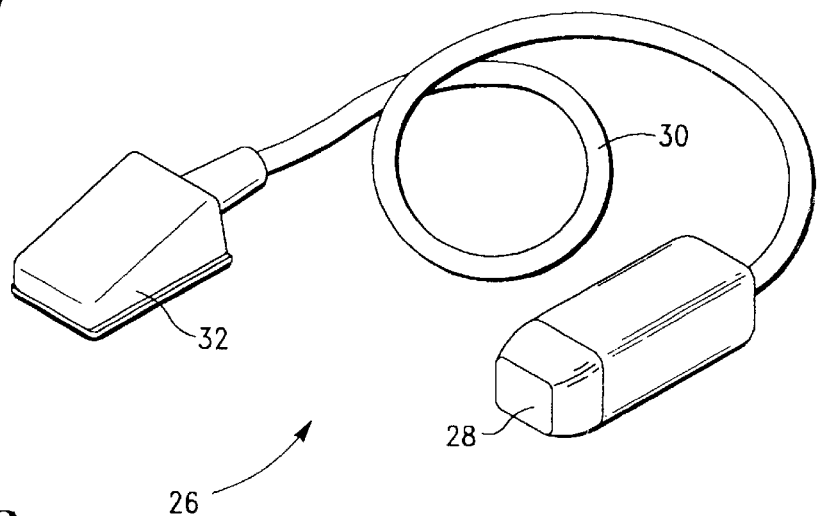
FIG. 2 is a pictorial diagram of a submersible ultrasound transducer assembly in accordance with one embodiment of the present invention.

A submersible ultrasound transducer assembly is shown in FIG. 2, a pictorial diagram. The transducer assembly is depicted generally by the numeral 26, and is submersible in a wide variety of liquids and in saturated steam at elevated temperatures and pressure, such as autoclaving.

The variety of liquids includes precleaning solutions and disinfectants, examples of which are provided in an Appendix to this Specification and are incorporated herein by reference. Two familiar examples of the precleaning solutions include soap and water, and alcohol.

Examples of the liquid disinfectants include CIDEX™ (a trademark of Johnson and Johnson Medical, Inc.) which is a 2% solution of glutaraldehyde salt in water, or STERIS 20™ (a trademark of the STERIS Corp.) which is a proprietary aqueous solution, peroxyacetic acid being the active ingredient. Other examples of the precleaning solutions and the disinfectants are set forth in the Appendix. The examples are intended to be illustrative only and not limiting of the invention.

The transducer assembly 26 is additionally submersible in saturated steam at temperatures up to 140 degrees centigrade and at pressures up to 2 atmospheres absolute. In particular the electrical and mechanical integrity of the submersible transducer assembly 26 remains intact during autoclave such as the Tuttnauer Bricknour Model No. 2340E automatic autoclave, or its equivalent. The transducer assembly 26 will maintain electrical and mechanical integrity when immersed in either a liquid or in saturated steam, as described, or simultaneously in a liquid and saturated steam.

The transducer assembly 26 includes a scan head 28, a cable 30 and a submersible connector 32. The scan head 28 typically has, at its front surface, an array of piezo electric elements (e.g., lead zirconate titanate or "PZT"), one or two matching layers, and an acoustic window or lens. A preferred scan head assembly is disclosed in U.S. Pat. No. 5,415,175 to Hanafy et al., and in U.S. Pat. No. 5,410,208 to Walters et al. Both of these patents are assigned to the assignee of the present invention and are incorporated herein by reference.

The submersible connector 32 meets all the requirements set forth in the Background section, i.e., convenience, electrical integrity and longevity. The submersible connector 32 has no moving parts, is sealed to exclude the intrusion of liquids, and is made from biologically compatible, i.e., non-toxic, materials.

Figures 6A, 6B:
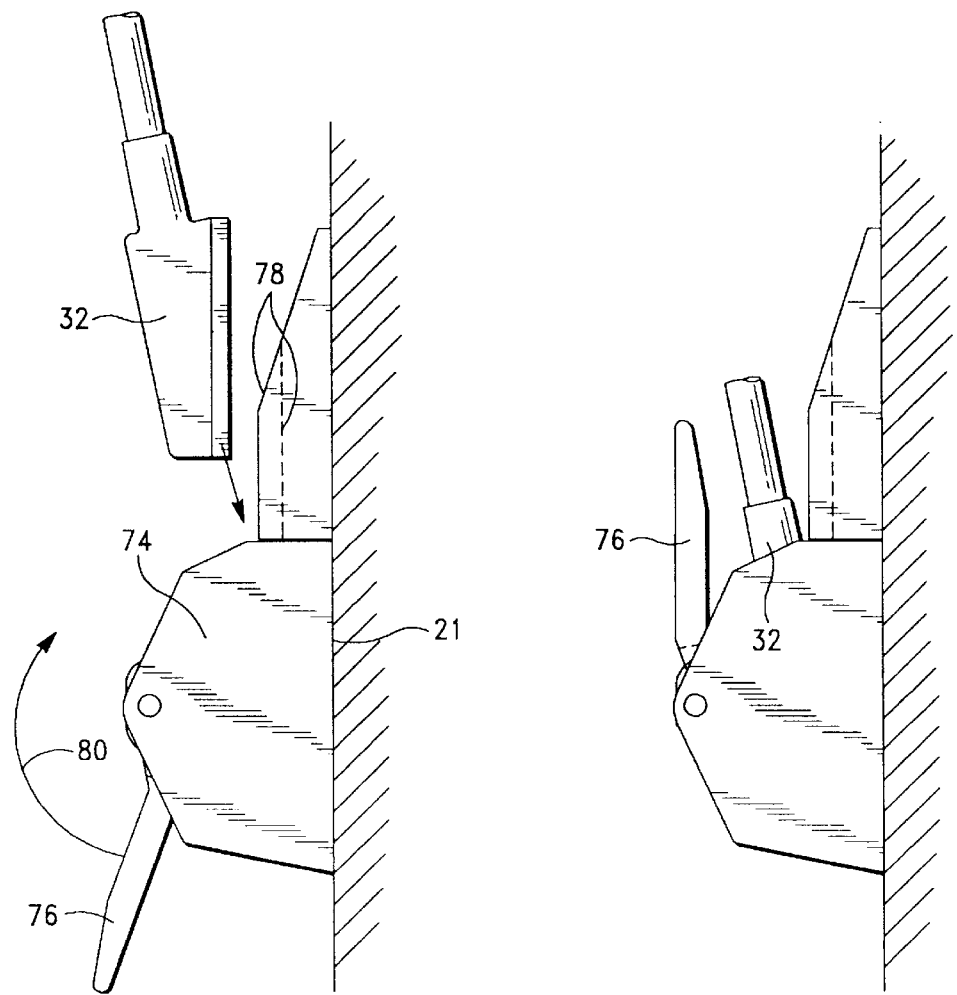
FIGS. 6A and 6B are pictorial diagrams illustrating a side view of a receptacle assembly for receiving the submersible connector shown in FIGS. 3A–3D.
Figure 7A:
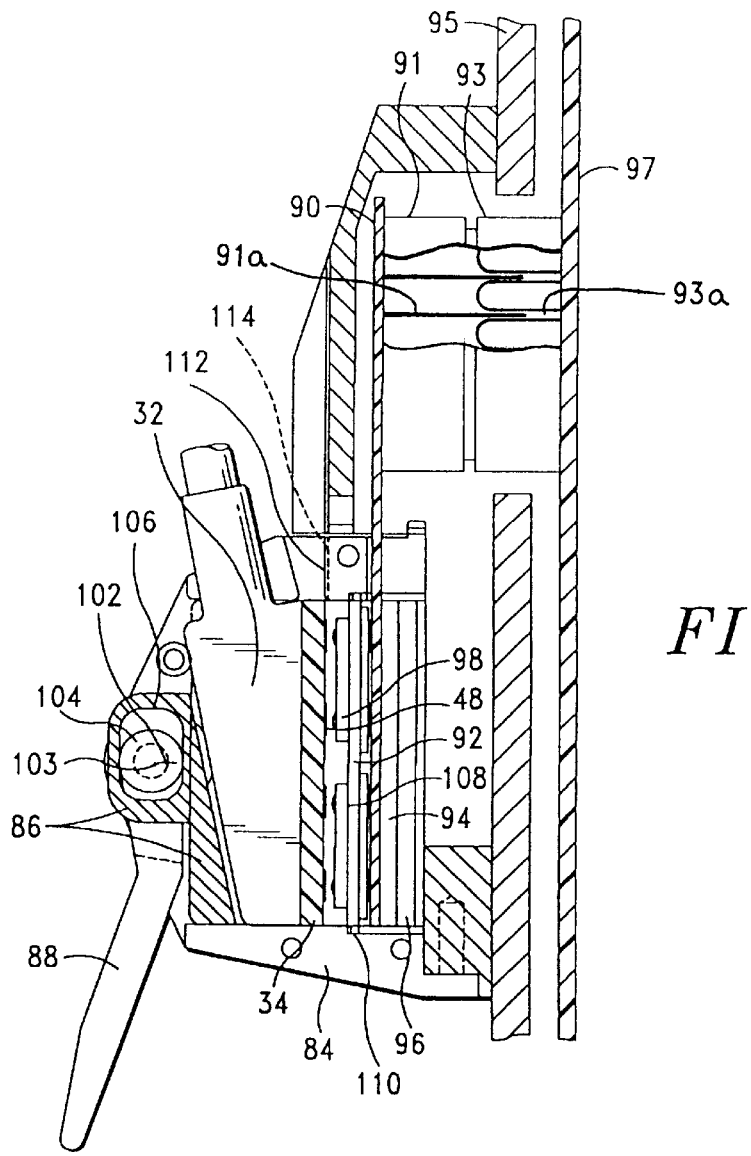
FIGS. 7A and 7B are cross-sectional side and end views, respectively, of the receptacle assembly illustrated in FIGS. 6A and 6B. Several contact nest assemblies are shown.

In order to connect the submersible connector 32 to an existing system console 20, a system receptacle, various embodiments of which are illustrated in FIGS. 6A, 6B, 7A, 9 and 10, is required. The system receptacle required by the submersible connector 32 is also the subject of this invention. In a preferred embodiment, the system receptacle is incorporated into the ultrasound system console, as illustrated in FIG. 7A. In other embodiments, existing system consoles are converted for use with the new submersible connector 32 through use of one of several embodiments of a separate adapter receptacle assembly which connects the submersible connector 32 to the system connector 22 (see for example FIGS. 9 and 10).

Submersible Connector (FIGS. 3A–3D. 4A. 4B, 5, 6A and 6B)

The submersible connector 32 will now be described with respect to FIGS. 3A–3D.

FIG. 3A is a side cross-sectional view of the submersible connector 32, and illustrates a printed wiring board 34, a molded housing 36, an electrical cage 38, a cable 40, a cable strain relief 42 and a cable clamp assembly 44.

FIG. 3B is a bottom view of the submersible connector 32 and illustrates an interfacing side 46 of the printed wiring board 34, a plurality of contact pads 48 and four reference edges 50.

FIG. 3C is an end view of the submersible connector 32 and illustrates the printed wiring board 34 having clamping surfaces 52.

FIG. 3D is a top cross-sectional view of the submersible connector and illustrates a plurality of cable termination pads 54 disposed on a termination side 56 of the printed wiring board 34.

The electrical function of the submersible connector 32 is to convey individual two-way electrical signals from the cable 40 to the contact pads 48. In one embodiment, the cable 40 includes 128 microcoaxial cables; of course, other embodiments, having for example 64, 256 or 512 microcoaxial cables, are also within the scope of this invention. Each microcoaxial cable is terminated at a pair of the cable termination pads 54. The cable termination pads 54 are connected through the printed wiring board 34 with corresponding contact pads 48 for connection to a system receptacle, such as that illustrated in FIG. 6A.

In the preferred embodiment, the edges as well as the contact surfaces of the contact pads 48 are plated to minimize corrosion when the connector 32 is submerged in a disinfectant. The plating can be hard gold or similar materials which provide a low resistance path for electrical signals yet have favorable chemical resistance to the disinfectants.

During the manufacturing process for the printed wiring board 34, plating is generally applied electrolytically. In a preferred embodiment, the printed wiring board 34 includes ground plane areas on both internal and external layers. All of the contact pads 48 as well as the ground plane areas must be grounded during the plating process. The grounding is accomplished by busing the signal traces in inner layers of the printed wiring board 34 to a common electrical structure located outside the confines of the part. When the part is machined free of the large panel from which it is made, all the signal lines become independent. This process is important to insure that the contact pads 48 are plated on their edges.

In the preferred embodiment of the submersible connector 32, a portion of the termination side 56 located outside the molded housing 36 along two opposed sides of the housing 36 define a pair of clamping surfaces 52 (FIG. 3C) which are used for mechanically clamping the submersible connector 32 to a compatible system receptacle 22.

In one preferred embodiment, the housing 36 and the cable strain relief 42 are molded in one piece to minimize locations which can collect foreign matter. This configuration makes the submersible connector 32 much easier to clean. A molded elastomer such as silicone rubber, supplied by Dow Corning, Inc., part number Q7-4750, is preferred for this purpose. The one-piece molded strain relief 42 and housing 36 are bonded to the termination side 56 of the printed wiring board 34 using thermal-set polymer adhesives. An epoxy such as "Plastilock #8" or Plastilock #9", supplied by Schul Industries, Inc., is preferred for such attachment.

In another preferred embodiment, the housing 36 is made of "Radel R-5500", supplied by Amaco, Inc., and the strain relief 42 is molded from an elastomer such as the silicone rubber described above. An epoxy such as "Plastilock #8" or "Plastilock #9", supplied by Schul Industries, Inc. is preferred for attaching the housing 36 to the printed wiring board 34.

In another preferred embodiment, the housing 36 is made of an aluminum alloy, 6061-T6, supplied by Alcoa, Inc., and is plated with zinc, then nickel, then gold to a 50 micro-inch thickness. Solder is used to attach the metal housing 36 to the printed wiring board 34. A bismuth-tin (leadless) solder supplied by Alpha Metals Inc. is preferred for this purpose.

In a preferred embodiment, the cable clamp assembly 44 is incorporated to minimize the chance that the cable 40 can be mechanically pulled free of the submersible connector 32.

In another preferred embodiment, the cable 40 (FIG. 3A) includes a plurality of microcoaxial conductors enclosed within a protective covering (jacket). In an embodiment of the transducer assembly 26 suitable for immersion in liquid only, not autoclaving, the cable covering and the molded strain relief are made of Medical Grade PVC elastomer made by Teknor, Inc., No. 3311-60NT. Another preferred material for the cable covering and molded strain relief 42 is a urethane elastomer, No. 58866, made by B.F. Goodrich, Corp. and useful for liquid submersion only, not autoclaving. Finally, a cable covering and molded strain relief permitting both immersion in liquid and autoclaving uses a silicone elastomer, No. Q7-4750, made by Dow Corning, Inc.

FIGS. 4A and 4B are a bottom and a top view, respectively, of the printed wiring board 34 for use in the submersible connector 32.

FIG. 4A illustrates the interfacing (contact pad) side 46 of the printed wiring board 34 for a 128-channel version of the submersible connector 32. The contact pads 48 disposed on the interfacing side 46 include 128 signal pads (each identified by a different number in the enlargement 58), sixty-eight ground return pads 60 (identified as "GR" in the enlargement 58), and 8 auxiliary pads 63 (identified as "I0–I7" in the enlargement 62). The auxiliary pads 63 provide a connector identification code usable by the ultrasound system console to identify the type of transducer assembly which is connected to the system.

In a preferred embodiment of the submersible connector 32, the signal pads 64 and the ground return pads 60 are arranged in a pattern on the interfacing side 46 of the printed wiring board 34 such that there is a ground return pad ("GR") next to each signal pad ("120" and "121"). This relationship is illustrated in the enlargement 58 by the pair of adjacent signal pads 64. This pattern of signal pads 64 and ground return pads 60 minimizes electrical cross talk between adjacent ultrasound channels. With respect to a printed wiring board having a low signal-to-ground ratio, the teachings of U.S. Pat. No. 5,417,578 are considered relevant and are incorporated by reference.

FIG. 4B is a top view illustrating a preferred embodiment of the termination side 56 of the printed wiring board 34. In the embodiment illustrated in FIG. 4B, the termination side 56 includes a plurality of cable termination pads 54 sufficient to terminate 128 microcoaxial cables (not shown). The illustrated termination side 56 also includes 8 jumper links 66 used to create an identification code for the submersible connector 32.

The termination side 56 of the printed wiring board 34 is used to terminate the individual conductors of the cable 40. In a preferred embodiment of the submersible connector 32, the cable includes 128 microcoaxial cables. These cables are terminated using microcoaxial cable terminations such as those described in U.S. Pat. No. 5,190,473 and the publication by R. Rothenberger et al. entitled "High-Density Zero Insertion Force Microcoaxial Cable Interconnection Technology," published by AMP Inc., the disclosures of both documents being incorporated by reference. The microcoaxial cable terminations (not shown) are attached to the cable termination pads 54 for terminating up to 128 microcoaxial cables.

The jumper links 66 are connected through the printed wiring board 34 with the auxiliary pads 63 located on the interface side 46 of the printed wiring board 34, and electrically connect all the auxiliary pads 63 together. During assembly of the submersible connector 32, predetermined jumper links are severed to isolate predetermined auxiliary pads 63. In this manner an identification code is implemented for the submersible connector 32. During routine operations, the system console detects the identity of the transducer being used by determining which auxiliary pads 63 remain connected to each other and which auxiliary pads 63 have been isolated.

FIG. 5 is a partial cross-sectional view of the submersible connector printed wiring board 34 showing how blind via technology is used to convey electrical signals from one side of the board to the other without providing a path for disinfectants to reach the critical microcoaxial cable termination area during sterilization procedures. FIG. 5 illustrates a portion of the printed wiring board 34, the interfacing side 46, a contact pad 48, a first blind via 68, an inner signal trace 70, a second blind via 72 and a cable termination pad 54.

There are several preferred methods for manufacturing the blind via printed wiring board illustrated in FIG. 5. One preferred method is to manufacture the upper part of the connector printed wiring board consisting of the inner trace 70, the dielectric 73, the microcoaxial cable termination pad 54, and the plated-through via 72. The lower half of the assembly includes the contact pad 48, and the dielectric 47. The two halves are assembled together using epoxy (not shown). The assembly is subsequently drilled partially in such a way that there is a hole that connects the contact pad 48 with the inner trace 70. Subsequent electroplating of this blind hole 68 results in an electrically conductive path between the pad 48, and the inner trace 70 and hence the microcoaxial cable termination pad 54.

The important feature of this construction is that fluid can not pass from the contact pad side of the printed wiring board to the cable termination side because the contact pad via is offset from the cable termination pad via.

Another method for producing a printed wiring board having vias which will not allow fluid to pass from one side to the other is to drill a hole through the board, electroplate the inner surface of the hole, connecting the electroplating with a trace on each side of the board, then to fill the plated hole with solder, creating a fluid barrier between the opposite sides of the printed wiring board.

In a preferred embodiment, the printed wiring board 34 is fabricated from "G-Tech", supplied by the General Electric Electromaterials Division.

FIGS. 6A and 6B are side pictorial views illustrating the manner in which the submersible connector 32 is attached to a system console 21.

FIG. 6A illustrates a system receptacle 74 used to attach the submersible connector 32 to the system console 21. The system receptacle 74 includes a locking/unlocking handle 76 and a guide slot 78. In FIG. 6A, the handle 76 is illustrated in an unlocked position and is rotated in the direction shown by the arrow 80 to a locked position. FIG. 6B illustrates the handle 76 in the locked position, as illustrated in FIG. 6B.

To connect the submersible connector 32 to the system console 20, the submersible connector 32 is placed into the guide slot 78 and slid into the system receptacle 74. The handle 76 is rotated to the locked position, completing an electrical connection between the submersible connector 32 and the system console 20.

To disconnect the submersible connector 32 from the system console 20, the handle 76 is rotated from the locked to the unlocked position and the submersible connector 32 is slid out of the receptacle 74 into the guide tray 78 and then lifted free of the system console.

Receptacle Assembly (FIGS. 7A, 7B, 8, 9 and 10)

Figure 7B:
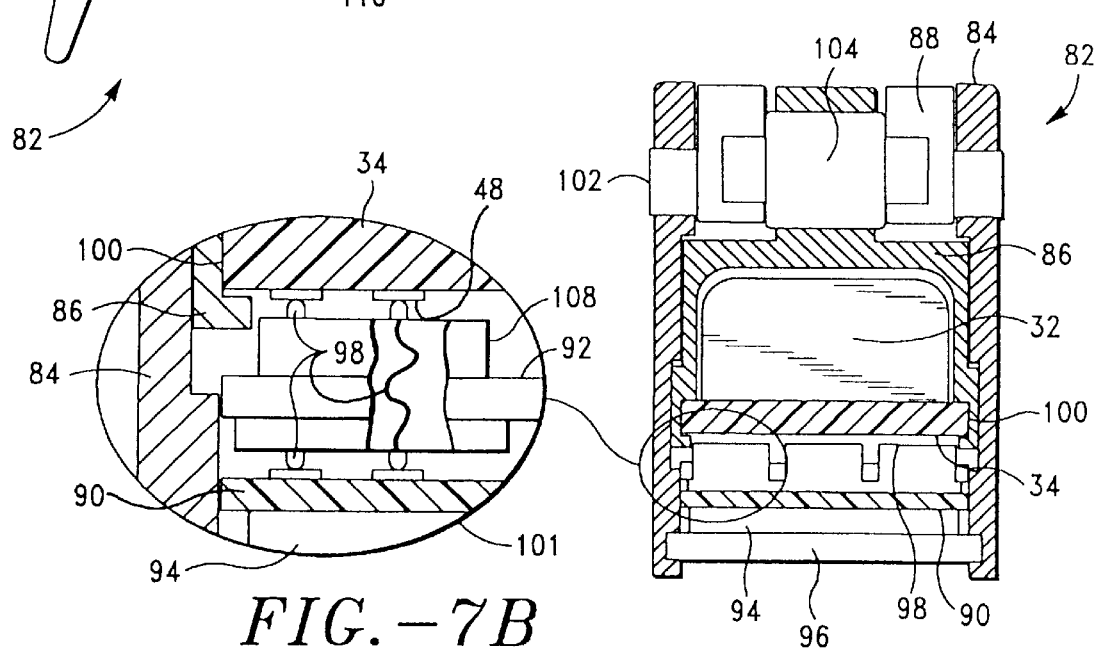
Figure 9:
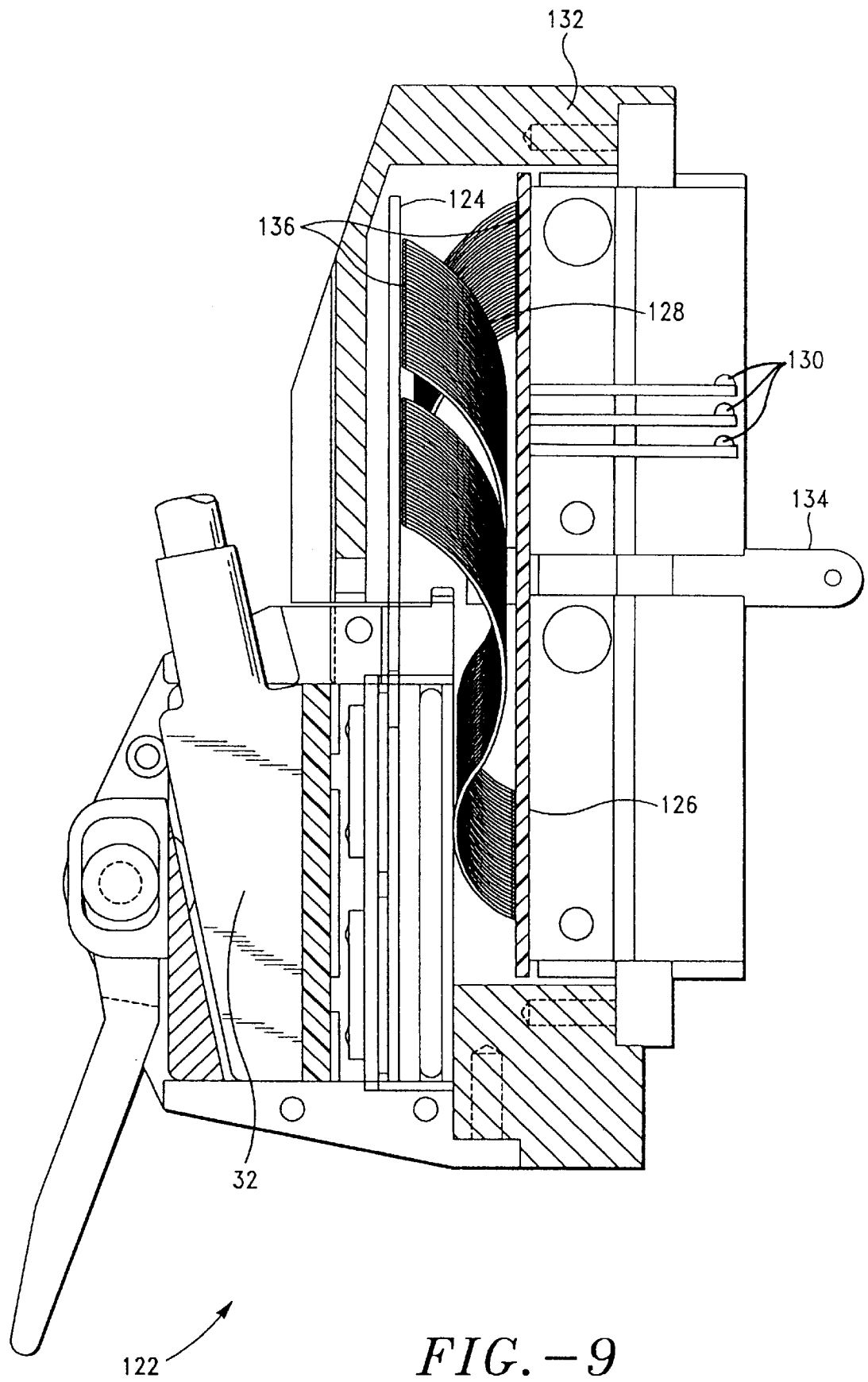
FIG. 9 is a cross-sectional side view of an adapter receptacle assembly for connecting the submersible connector to a non-compatible system receptacle.
Figure 10:
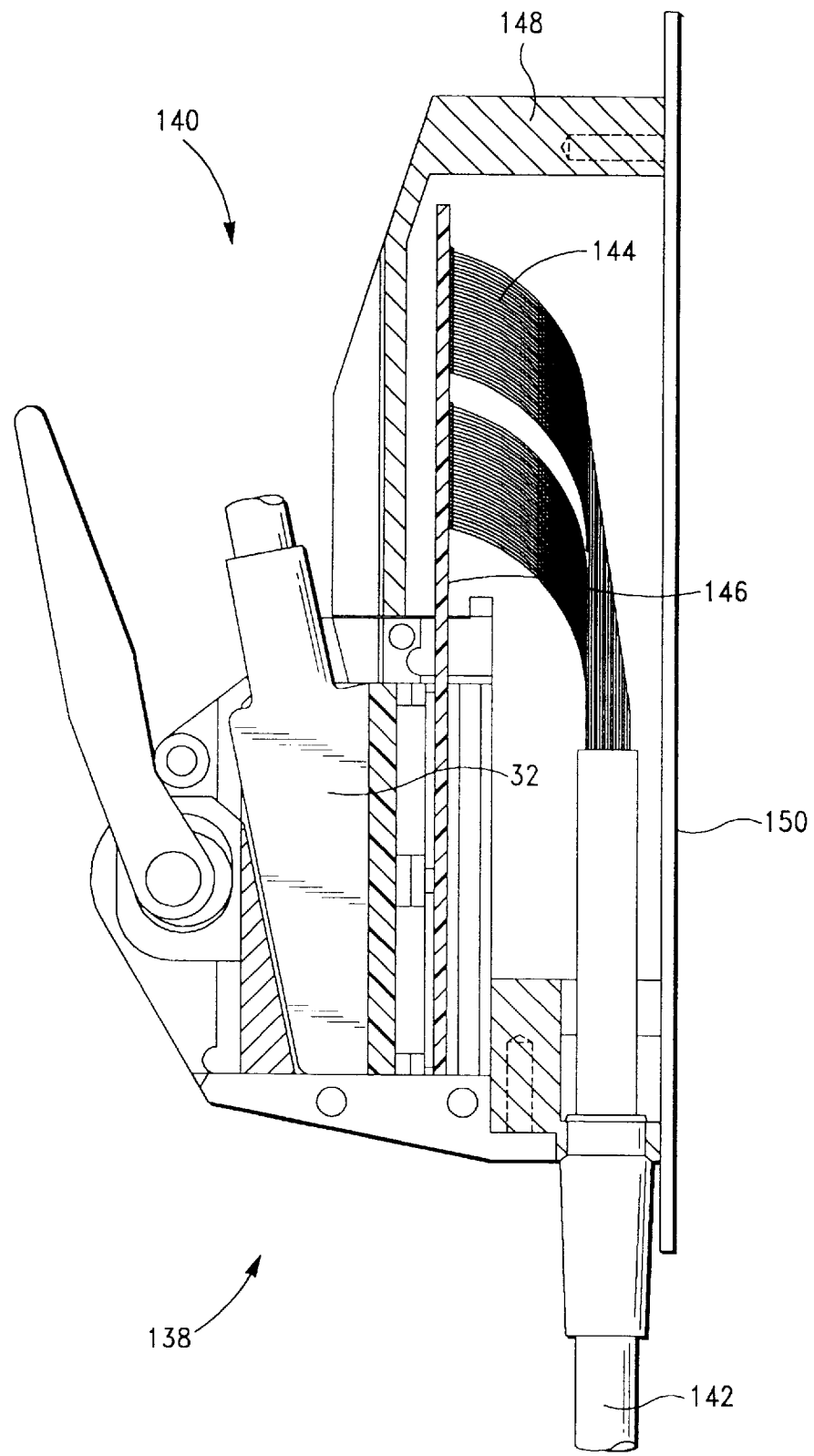
FIG. 10 is a cross-sectional side view of an adapter receptacle assembly for connecting the submersible connector to an extension cable.

FIGS. 7A, 7B, 9 and 10 illustrate several embodiments of a receptacle which permits electrical and mechanical connection with the submersible connector 32, such as illustrated in FIGS. 6A and 6B. FIGS. 7A and 7B are cross-sectional side and end views, respectively, of the system receptacle 74 illustrated in FIGS. 6A and 6B. The system receptacle 74 allows connection of the submersible connector 32 directly to the system console 21. FIG. 9 is a cross-sectional side view of an adapter receptacle assembly for connecting the submersible connector 32 to a system console 21 having a system receptacle which is not compatible with the submersible connector 32. Finally, FIG. 10 is a cross-sectional side view of another embodiment of an adapter receptacle assembly for connecting the submersible connector 32 to the system console 21 through an extension cable.

Each of the embodiments illustrated in FIGS. 7A, 7B, 9 and 10 share common features with respect to the manner in which the submersible connector is mated to a compatible connector. These common features will now be described with respect to FIGS. 7A and 7B, taken in conjunction with FIGS. 3A–3D.

In FIGS. 7A, 7B, the system receptacle is depicted generally by the numeral 82. The system receptacle 82 includes the following major elements: a receptacle frame 84, a slide 86, a locking/unlocking handle 88, a system printed wiring board 90, a contact nest plate 92, a compressible rubber pad 94 and a load plate 96. The submersible connector 32 is illustrated in outline form, and the submersible connector printed wiring board 34 and contact pads 48 are shown for illustrating the manner in which the submersible connector 32 attaches to the system receptacle 82.

The system receptacle 82 has several purposes. It must properly align the submersible connector contact pads 48 with respect to spring contacts 98 and corresponding contact pads disposed on the system printed wiring board 90. It must compress these elements together to affect an electrical interconnection, and to provide a signal path to ultrasound receiver/transmitter circuitry within the system console 21.

With reference to FIGS. 7A and 7B, the major components include the submersible connector 32, and the receptacle frame 84. The submersible connector 32 is inserted into the system receptacle 82 with the clamping surfaces 52 engaging a pair of opposed recesses 100 in the slide 86 (FIG. 7B). The slide 86 is constrained to move (to the right and to the left in FIG. 7A) within the receptacle frame 84 by virtue of the geometry of these parts.

The motion of the slide 86 within the receptacle frame 84 is caused by the locking/unlocking handle 88 which pivots about a shaft 102 that rotates within a hole in the receptacle frame 84. The center line 103 of a needle bearing assembly 104 is eccentric with respect to the centerline of the shaft 102 causing the needle bearing assembly 104 to move in a circular path with respect to the shaft 102 as the locking/unlocking handle 88 is rotated about the shaft 102.

This circular motion of the needle bearing assembly 104 is translated to a linear motion of the slide 86 by a cam 106 attached to the slide. The cam 106 forces the slide 86 to move in a linear manner (either direction) as defined by the position of the locking/unlocking handle 88. As the locking/unlocking handle 88 is rotated in the clockwise direction, the slide 86 and the submersible connector 32 move to the right with respect to the receptacle frame 84 (as viewed relative to the orientation of the receptacle as assembly 82 in FIG. 7A). The submersible connector printed wiring board 34 is aligned with respect to the slide 86 using the reference edges 50 of the printed wiring board 34 (FIG. 3B).

As the submersible connector 32 moves to the right (FIG. 7A), the contact pads 48 come in contact with corresponding spring contacts 98 of a contact nest 108 (see the enlargement 101 in FIG. 7B schematically showing an exemplary spring contact 98). As the rightward motion continues, the spring contacts 98 on both sides of the contact nest 108 and the contact nest itself are displaced towards corresponding contact pads on the system printed wiring board 90. As the travel continues, all the clearances between the spring contacts and the contact pads are consumed and the spring contacts 98 start to deflect under load.

Continued rightward displacement of the submersible connector printed wiring board 34 causes the spring contacts 98 to compress fully, and the system printed wiring board 90 to be displaced to the right, constrained by the compressible rubber pad 94. In addition to the compressible rubber pad's function of translating a linear compression to a reaction force, the pad 94 also accommodates the dimensional tolerances of all the parts of the mechanical sandwich. The spring contacts 98 reach the full compression allowed the contact nest 108 and the rubber pad 94 is compressed to a final thickness as the locking/unlocking handle 88 is rotated to the end of its travel.

The reaction force required to compress the spring contacts 98 and the compressible rubber pad 94 is generated by virtue of the load plate 96 which is mechanically attached to the receptacle frame 84. Electrical connection between the contact pads 48 on the submersible connector printed wiring board 34 and the contact pads on the system printed wiring board 90 is thus achieved by virtue of the compression of the spring contacts 98.

Before moving on to another topic, it should be noted that the system printed wiring board 90 is made of a compliant material and a thickness permitting the board 90 to conform to slight variations in mechanical tolerances. This function insures a reliable electrical contact between the contact pads on the system printed wiring board 90 and the spring contacts 98. If the board 90 is too stiff, the compressible rubber pad 94 is unable to adjust the receptacle assembly 82 to the slight mechanical variations which exist in every product. A preferred thickness for the system printed wiring board 90 is between 0.032" and 0.048".

Additional features depicted in FIGS. 7A and 7B which are required to make a practical system receptacle 82 are as follows. The system printed wiring board 90 is attached to a system console printed wiring board 97 via mating connectors 91, 93 extending through an opening in console enclosure 95. Connector 91 is attached to the system printed wiring board 90, making electrical connection with the system board contact pads. Mating connector 93 is attached to the console printed wiring board 97 for completing electrical connection between the system board 90 and the console board 97 employing known connector arrangements such as pins 91a and sockets 93a shown schematically in FIG 7A.

During insertion of the submersible connector 32 into the system receptacle 82, the submersible connector contact pads 48 are precluded from making premature contact with the spring contacts 98 by virtue of a preferred configuration of the slide 86. The submersible connector printed wiring board 34 is contained by the opposed recesses 100 in the slide 86 (FIG. 7B).

The contact nest plate 92 is constrained in its movement by two ears 110 (FIG. 7A) which are keyed to the receptacle frame 84. The contact nest plate 92 and thus the contact nests 108 and the spring contacts 98 are prevented from approaching the path of the submersible connector printed wiring board 34 as the submersible connector 32 is inserted into the system receptacle 82.

The opposed recesses 100 and a frame cross bar 112 (FIG. 7A) preclude the slide 86 from moving unless the submersible connector 32 is inserted fully. As seen in FIGS. 7A and 7B, when the submersible connector printed wiring board 34 is inserted, it is prevented from moving toward the system printed wiring board 90 by the edges of the slide 86 (FIG. 7B). Until the connector printed wiring board 34 is fully inserted (FIG. 7A), it bears against the frame crossbar 112 between reliefs 114 (FIG. 7A). The frame crossbar 112, as its name suggests, is a bar which spans across the system receptacle, facing the contact side of the connector printed wiring board 34. The slide 86 cannot move unless the submersible connector printed wiring board 34 clears the frame cross bar 112. When the submersible connector 32 is properly seated within the system receptacle 82, the slide 86 can move in the linear fashion towards the right (FIG. 7A). FIG. 10 shows the connector printed circuit board 34 moved to the right after the top of board 34 has cleared the bottom of crossbar 112 as indicated. There are reliefs 114 in the frame cross bar 112 which minimize the chance that the contact pads 48 of the submersible connector 32 will be damaged during insertion into the system receptacle 82.

Figure 8:
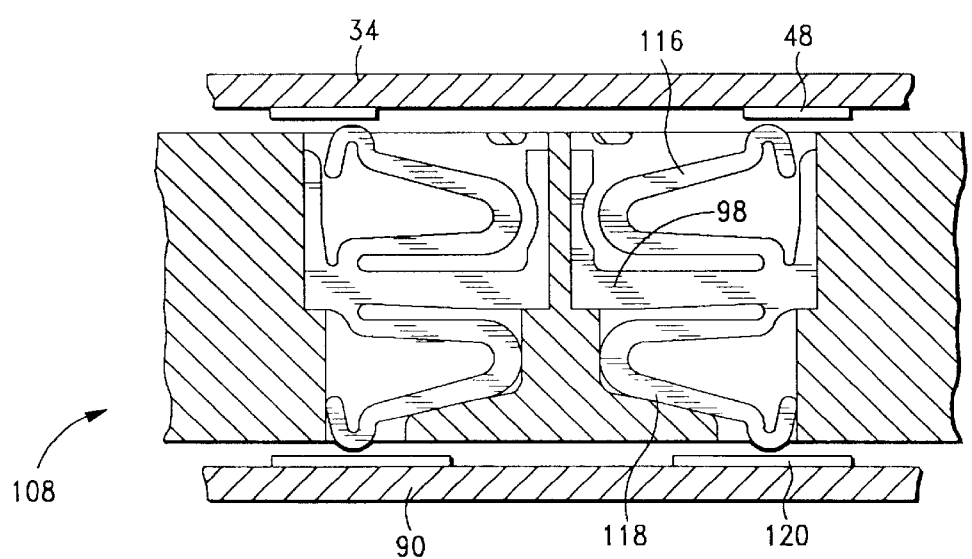
FIG. 8 is a partial cross-sectional view of a contact nest assembly such as illustrated in FIGS. 7A and 7B.

FIG. 8 is a partial cross-sectional view taken through the contact nest 108, illustrating a spring contact 98 within the contact nest and sandwiched between the contact pads of the two printed wiring boards 34 and 90. A variety of contact nests 108 and contact springs 98 are disclosed in U.S. Pat. Nos. 5,308,252 and 5,358,411, the teachings of which are incorporated by reference.

Each spring contact 98 actually has two independent cantilever elements 116 and 118. The upper element 116 makes contact with the contact pad 48 for the submersible connector 32 while the lower element 118 makes contact with the contact pad 120 on the system printed wiring board 90. A low inductance signal path is inherent to the design of the spring contact 98. Also inherent in this design is "contact wipe" which is accomplished during actuation. The small wiping action is important to the low contact resistance, contamination resistance, and long contact life of this connector system.

The function of the plastic contact nest 108 is to properly position the multitude of spring contacts 98 with respect to the contact pads 48, 120. Several contact nests 108 are used in the system receptacle 82. The contact nests 108 fit within the contact nest plate 92 illustrated in FIGS. 7A and 7B. The function of the contact nest plate 92 is to properly locate the spring contacts 98 with respect to the contact pads 48, 120 on the submersible connector 32 and the system printed wiring board 90.

FIG. 9 is a cross-sectional side view illustrating an adapter receptacle assembly 122 which allows the submersible connector 32 to interface properly to existing ultrasound system consoles having an ITT Canon style system receptacle 22 (FIG. 1). The system receptacle 82 and its operation are described above with respect to FIGS. 7A and 7B. The following components are identified in FIG. 9 to describe the salient differences between the adapter receptacle assembly 122 and the previously described system receptacle 82: the submersible connector 32, a system printed wiring board 124, an adapter printed wiring board 126, a plurality of microcoaxial cables 128, representative group of a plurality of cantilever spring contacts 130, a housing 132 and a locking shaft 134.

Electrical signals are conveyed from the spring contacts 98 (FIG. 7A) through corresponding contact pads 120 (FIG. 8) on the system printed wiring board 124, along internal traces in the system printed wiring board 124, then to microcoaxial cable termination pads 136 on the opposite surface of the system printed wiring board 124. The microcoaxial cable termination pads 136 are electrically connected to similar pads on the surface of the adapter printed wiring board 126 through use of microcoaxial cables 128. The adapter printed wiring board 126 has internal traces which convey the signals to corresponding plated through holes to which the cantilever spring contacts 130 have been soldered. Termination of the microcoaxial cables 128 to both printed wiring boards includes the termination of the center signal leads to the appropriate pads, and the termination of the radial shield to adjacent ground pads.

The housing 132 completes the assembly. The entire adapter assembly is installed and locked to the system receptacle 22 (FIG. 1) through use of a hex tool to turn the locking shaft 134.

FIG. 10 is a cross-sectional side view which illustrates a remote adapter 138 for the submersible connector 32. The remote adapter 138 includes a receptacle assembly 140, such as that described above with respect to FIGS. 7A and 7B. The receptacle assembly 140 is attached and electrically terminated to a cable assembly 142 which is attached and electrically terminated to a connector (not illustrated) which is compatible for mating with the system receptacle 22 (FIG. 1). The length of the cable assembly 142 allows the receptacle assembly 138 to be placed in locations convenient to the operator of the ultrasound equipment. The cable assembly 142 includes a plurality of individual microcoaxial cables 144. Each of these microcoaxial cables 144 is terminated to an appropriate microcoaxial cable termination pad on the system printed wiring board 146. A housing 148 and cover plate 150 complete remote adapter 138.

While the foregoing detailed description has described several embodiments of the submersible connector and compatible receptacle assemblies in accordance with this invention, it is to be understood that the above description is illustrative only and not limiting of the disclosed invention. Particularly, the submersible connector may include a different number of contact pads and terminate a cable using non-coaxial conductors. Also the configuration of the molded housing may differ from that illustrated and described. It will be appreciated that the various embodiments of the receptacle assembly may vary in the arrangement and selection of parts while remaining within the scope and spirit of this invention. Thus the invention is to be limited only by the claims as set forth below, and all legal equivalents thereof.

What is claimed is:

1. A submersible connector for electrically connecting a transducer assembly to an ultrasound system console, the submersible connector comprising:

a printed wiring board having contact pads on one surface and cable termination pads on an opposed surface, blind vias electrically connecting predetermined contact pads to predetermined cable termination pads through the printed wiring board; and a housing enclosing the cable termination pads, the housing including an opening for a cable, the housing adapted for sealing with the cable, whereby the connector is submersible in a liquid, in saturated steam, or simultaneously in a liquid and saturated steam, at elevated temperatures and pressure without intrusive degradation.

2. The submersible connector as set forth in claim 1, wherein the printed wiring board defines opposed clamping surfaces for conveying clamping forces to the contact pads.

3. The submersible connector as set forth in claim 1, the printed wiring board further including at least one reference edge for referencing the submersible connector to a mating connector.

4. The submersible connector as set forth in claim 1, further including the contact pads having contact pad edges and the pads and edges being plated.

5. The submersible connector as set forth in claim 4, further including the contact pads and the contact pad edges being gold plated.

6. The submersible connector as set forth in claim 1, further including microcoaxial cable terminations connected to the enclosed termination pads.

7. The submersible connector as set forth in claim 6, wherein the printed wiring board and the microcoaxial cable terminations define signal and ground pads arranged in at least one row and having one ground pad between each two signal pads, whereby two terminated microcoaxial cables share a common ground pad.

8. The submersible connector as set forth in claim 1, wherein the cable termination pads include signal and ground pads disposed on the printed wiring board in at least one row and having one ground pad between each two signal pads.

9. The submersible connector as set forth in claim 8, further including a plurality of rows of the cable termination pads, the rows being disposed in an alternating pattern in which a signal pad is adjacent to three ground pads and a ground pad is adjacent to six signal pads.

10. The submersible connector as set forth in claim 1, wherein the printed wiring board includes at least one group of contact pads being electrically interconnected by printed wiring, portions of the interconnecting printed wiring being severable for electrically isolating a predetermined at least one of said group of contact pads, whereby predetermined pads are isolated to create an electrical identification code.

11. The submersible connector as set forth in claim 6, further including a plurality of microcoaxial cables being terminated at said microcoaxial cable terminations, said plurality of microcoaxial cables being enclosed within a protective covering, the protective covering and the enclosed microcoaxial cables extending through the opening in the housing, and the housing providing a strain relief and forming a seal with the protective covering.

12. The submersible connector as set forth in claim 1, wherein the housing is molded and includes a mating surface for attachment to a surface of the printed wiring board.

13. The submersible connector as set forth in claim 12, wherein the termination pads define a termination pad surface of the printed wiring board, and further including the mating surface being bonded to the termination pad surface of the printed wiring board.

14. The submersible connector as set forth in claim 11, wherein said plurality includes at least 64 microcoaxial cables.

15. The submersible connector as set forth in claim 11, wherein said plurality includes at least 256 microcoaxial cables.

16. The submersible connector as set forth in claim 1, wherein the contact pads define a contact pad surface of the printed wiring board and the contact pad surface includes a printed wiring ground plane forming ground contacts between adjacent contact pads.

17. A receptacle assembly for electrically and mechanically mating a submersible connector, of the type having a plurality of contact pads disposed on one surface of a printed wiring board, with an ultrasound imaging system, the receptacle assembly comprising:
 a receptacle printed wiring board having receptacle contact pads disposed on one surface in a pattern for mating compatibly with corresponding contact pads of the submersible connector, the receptacle printed wiring board also having pads compatible for connection with the ultrasound imaging system, predetermined receptacle contact pads being electrically connected to predetermined system compatible pads;
 a receiving assembly defining a receiving space, opening in a direction substantially parallel to said receptacle printed wiring board, for insertion of the submersible connector in an insertion direction and for aligning the contact pads of the received submersible connector in opposition to and spaced apart from the corresponding receptacle contact pads;
 a contact nest assembly including a plurality of cantilevered spring contacts located between opposed contact pads; and
 means for effecting relative movement of the opposed contact pads in a direction perpendicular to said insertion direction, bringing the opposed contact pads into contact with corresponding cantilevered spring contacts, and compressing the cantilevered spring contacts;
 whereby a reliable electrical connection is established between the opposed contact pads.

18. The receptacle assembly as set forth in claim 17, further including means for locking the received submersible connector within the defined receiving space, and means for unlocking and releasing the submersible connector.

19. The receptacle assembly as set forth in claim 17, wherein the means for bringing opposed contact pads into contact with corresponding cantilevered spring contacts includes an eccentric operating handle having a needle bearing assembly for translating a rotating motion to a linear motion.

20. The receptacle assembly as set forth in claim 19, wherein the means for bringing opposed contact pads into contact with corresponding cantilevered spring contacts also includes an operating slide cooperating with the needle bearing assembly to translate a rotational motion of the eccentric operating handle to linear positive locking and unlocking motions.

21. The receptacle assembly as set forth in claim 20, further including a shaped cam and follower in the operating slide for constraining the linear motion to a clamping and unclamping motion.

22. The receptacle assembly as set forth in claim 21, further including a cross bar assembly connected to the eccentric operating handle for preventing the clamping motion by the slide until the submersible connector is properly aligned within the defined receiving space.

23. The receptacle assembly as set forth in claim 17, further including a system electrical connector having electrical contacts, and electrical conductors connecting predetermined electrical contacts with predetermined system compatible pads of the receptacle printed wiring board.

24. The receptacle assembly as set forth in claim 17, further including microcoaxial cable terminations connected to the system compatible pads of the receptacle printed wiring board.

25. The receptacle assembly as set forth in claim 24, further including a system electrical connector having electrical contacts terminating a system end of microcoaxial cables, the cables being terminated at the other end by the microcoaxial cable terminations connected to the system compatible pads of the receptacle printed wiring board.

26. The receptacle assembly as set forth in claim 25, wherein a portion of all microcoaxial cables is enclosed in a protective covering and the system electrical connector is at a distance from the receptacle printed wiring board, whereby the receptacle assembly defines a receptacle extension cable.

27. The receptacle assembly as set forth in claim 25, wherein the system electrical connector is compatible with the ITT Canon DL™ Series system receptacle.

28. The receptacle assembly as set forth in claim 25, wherein the system electrical connector includes the terminated system end of the microcoaxial cables being connected to plated through holes, each hole being electrically and mechanically attached to a compatible system contact.

29. The receptacle assembly as set forth in claim 26, wherein the system electrical connector is compatible with the ITT Canon DL Series™ system receptacle.

\* \* \* \* \*